(12) United States Patent
Shepelev

(10) Patent No.: US 9,671,915 B2
(45) Date of Patent: Jun. 6, 2017

(54) AVOIDANCE OF BENDING EFFECTS IN A TOUCH SENSOR DEVICE

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 62 days.

(21) Appl. No.: 14/788,616

(22) Filed: Jun. 30, 2015

(65) Prior Publication Data

US 2017/0003778 A1    Jan. 5, 2017

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0414* (2013.01)

(58) Field of Classification Search
CPC ...... G06F 3/0412; G06F 3/0414; G06F 3/044; G06F 2300/04102
USPC .................................................. 345/173–179
See application file for complete search history.

(56) References Cited

U.S. PATENT DOCUMENTS

| | | | |
|---|---|---|---|
| 8,411,064 B2 | 4/2013 | Noguchi et al. | |
| 8,723,841 B2 * | 5/2014 | Ishizaki | G06F 3/044 178/18.01 |
| 8,743,087 B2 | 6/2014 | Hotelling et al. | |
| 8,766,950 B1 * | 7/2014 | Morein | G06F 3/044 345/173 |
| 8,860,685 B2 * | 10/2014 | Takeuchi | G06F 3/0412 178/18.06 |
| 8,970,524 B2 | 3/2015 | Kim et al. | |
| 8,994,673 B2 | 3/2015 | Hwang et al. | |
| 9,024,913 B1 | 5/2015 | Jung et al. | |
| 9,244,581 B2 * | 1/2016 | Morein | G06F 3/0412 |
| 2007/0074914 A1 | 4/2007 | Geaghan et al. | |
| 2009/0267916 A1 | 10/2009 | Hotelling | |
| 2009/0314621 A1 | 12/2009 | Hotelling | |
| 2010/0108409 A1 | 5/2010 | Tanaka et al. | |
| 2011/0069033 A1 | 3/2011 | Meng et al. | |
| 2011/0096025 A1 | 4/2011 | Slobodin et al. | |
| 2011/0279169 A1 | 11/2011 | Salaverry | |
| 2011/0304564 A1 | 12/2011 | Kim et al. | |
| 2012/0038583 A1 | 2/2012 | Westhues et al. | |

(Continued)

*Primary Examiner* — Vijay Shankar

(74) *Attorney, Agent, or Firm* — Patterson + Sheridan, LLP

(57) ABSTRACT

Disclosed herein include an input device, processing system and methods for touch sensing. Implementations advantageously are resistive to diminished performance when a film stack of an input device is bent in response to an input (touch) event. In one implementation, an input device is provided that includes a housing, a plurality of sensor electrodes disposed in a pattern on a substrate, a plurality of routing traces coupled to the sensor electrodes, an electrically conductive shield and a compressible layer. The electrically conductive shield has an areal extent approximately equal or greater than an areal extent of the pattern of sensor electrodes. The electrically conductive shield and the substrate are part of a display film stack disposed in the housing. The compressible layer is disposed between the display film stack and housing. The compressible layer is configured to allow the display film stack to deflect towards a bottom of the housing.

25 Claims, 6 Drawing Sheets

(56) References Cited

U.S. PATENT DOCUMENTS

| | | |
|---|---|---|
| 2012/0075214 A1 | 3/2012 | Kim |
| 2012/0162094 A1 | 6/2012 | Kent et al. |
| 2012/0182261 A1 | 7/2012 | Wang et al. |
| 2013/0050139 A1 | 2/2013 | Gute |
| 2013/0113695 A1 | 5/2013 | Tseng et al. |
| 2013/0215075 A1 | 8/2013 | Lee et al. |
| 2013/0321296 A1 | 12/2013 | Lee et al. |
| 2014/0043281 A1 | 2/2014 | Kim et al. |
| 2014/0132525 A1 | 5/2014 | Pyo et al. |
| 2014/0132526 A1 | 5/2014 | Lee et al. |
| 2014/0132534 A1 | 5/2014 | Kim |
| 2014/0132559 A1 | 5/2014 | Kim |
| 2014/0267145 A1 | 9/2014 | Shepelev |
| 2015/0054803 A1 | 2/2015 | Yashiro et al. |
| 2015/0130753 A1 | 5/2015 | Woo et al. |
| 2015/0138173 A1 | 5/2015 | Bae et al. |

\* cited by examiner

AVOIDANCE OF BENDING EFFECTS IN A TOUCH SENSOR DEVICE

BACKGROUND OF THE INVENTION

Field of the Invention

Embodiments of the present invention generally relate to a method and apparatus for touch sensing, and more specifically, a capacitive touch sensing device having grid electrodes for improved absolute sensing, and methods for using the same.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Many proximity sensor devices utilize an array of sensor electrodes to measure a change in capacitance indicative of the presence of an input object, such as a finger or stylus, proximate the sensor electrodes. The conductive routing traces utilized to couple the array of sensor electrodes to a processing system typically are arranged in a layer disposed between the sensor electrodes and a conductive housing of the sensor device. Since the film stack may deflect or bend when exposed to an input force such as a touch event, the conductive routing traces may be displaced towards the housing. The resulting change in distance between the conductive routing traces and the housing causes a change in the background capacitance, which produces a distortion in an image of measured response from the sensor device. The distortion degrades the performance of the sensor device.

Thus, there is a need for an improved proximity sensor device.

SUMMARY

Disclosed herein include an input device, processing system and methods for touch sensing. Implementations advantageously are resistive to diminished performance when a film stack of an input device is bent in response to an input (touch) event. In one implementation, an input device is provided that includes a housing, a plurality of sensor electrodes disposed in a pattern on a substrate, a plurality of routing traces coupled to the sensor electrodes, an electrically conductive shield and a compressible layer. The electrically conductive shield has an areal extent approximately equal or greater than an areal extent of the pattern of sensor electrodes. The electrically conductive shield and the substrate are part of a display film stack disposed in the housing. The compressible layer is disposed between the display film stack and housing. The compressible layer is configured to allow the display film stack to deflect towards a bottom of the housing.

In another implementation, an input device is provided that includes a display film stack configured to display an image. The display film stack has a viewing side and a non-viewing side. The display film stack includes an electrically conductive shield, a plurality of sensor electrodes, a plurality of routing traces coupled to the sensor electrodes, and a compressible layer. The plurality of sensor electrodes are disposed on the viewing side of the electrically conductive shield, while the electrically conductive shield are disposed between the routing traces and the non-viewing side of the display film stack. The compressible layer is disposed between the non-viewing side of the display film stack and a grounded surface of the input device. The compressible layer is configured to allow the display film stack to deflect towards the grounded surface of the input device in response to a force applied normally to the viewing side of the display film stack.

In another implementation, an input device is provided that includes a display film stack configured to display an image. The display film stack configured to display an image thought a top surface. The display film stack includes a plurality of sensor electrodes disposed in a matrix array, a plurality of routing traces coupled to the sensor electrodes, and an electrically conductive shield. The electrically conductive shield has an areal extent approximately equal or greater than an active area of the plurality of sensor electrodes. The electrically conductive shield is disposed below the matrix array and routing traces relative to the top surface. A compressible layer is disposed below the display film stack. The compressible layer configured to allow the display film stack to deflect in response to a normal force applied to the top surface of display film stack. A processing system is coupled to the plurality of routing traces and to the electrically conductive shield. The processing system is configured to operate the plurality of sensor electrodes for touch sensing and to operate the electrically conductive shield with a signal that mitigates changes in background capacitance across the plurality of sensor electrodes as the displace stack bends.

In another implementation, an input device is provided that includes a plurality of sensor electrodes disposed in a matrix array, a compressible layer, a plurality of routing traces coupled to the sensor electrodes, and an electrically conductive shield. The plurality of sensor electrodes are configured to provide a metric indicative of presence of an input object in a sensing region proximate the matrix array when driven with a sensing signal. The compressible layer is disposed below the film stack opposite the sensing region. The compressible layer is configured to allow the display film stack to deflect in response to a normal force applied to the film stack in a direction of the electrically conductive shield. The electrically conductive shield has an areal extent approximately equal or greater than an active area of the plurality of sensor electrodes, the matrix array, routing traces and electrically conductive shield part of a film stack. The matrix array is closer to the sensing region than the electrically conductive shield. The electrically conductive shield is configured to mitigate changes in background capacitance across the plurality of sensor electrodes as the film stack bends.

In another implementation, a processing system is provided that includes a touch control module having circuitry configured to operate a plurality of sensor electrodes disposed on a substrate for touch sensing, and operate an electrically conductive shield disposed between the substrate and a grounded surface of an input device with a shield signal that mitigates changes in background capacitance across the plurality of sensor electrodes as the substrate bends in response to an force applied to the sensor electrodes during a touch event.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
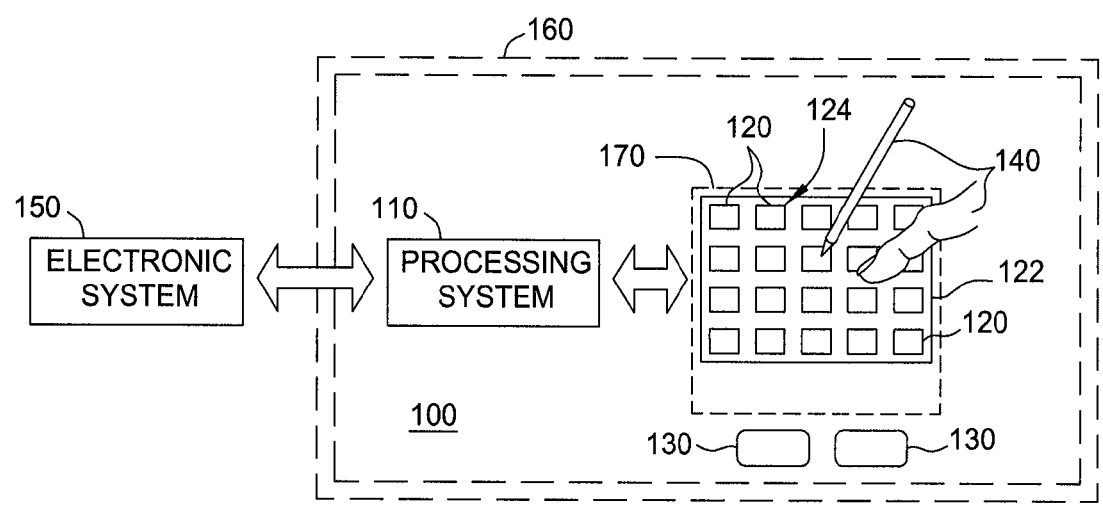
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously are resistive to diminished performance when a film stack of the sensor device is bent in response to an input (touch) event.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in input devices that are not integrated with display devices.

The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120, and may optionally include one or more grid electrodes 122. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering, demodulation or other signal conditioning. In various embodiments, the processing system 110 generates a capacitive image directly from the resulting signals received with sensing elements 124 (sensor electrodes 120). In other embodiments, processing system 110 spatially filters (e.g., taking a difference, weighted sum of neighboring elements) the resulting signals received with sensing elements 124 (or sensor electrodes 120) to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate and/or Vcom voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
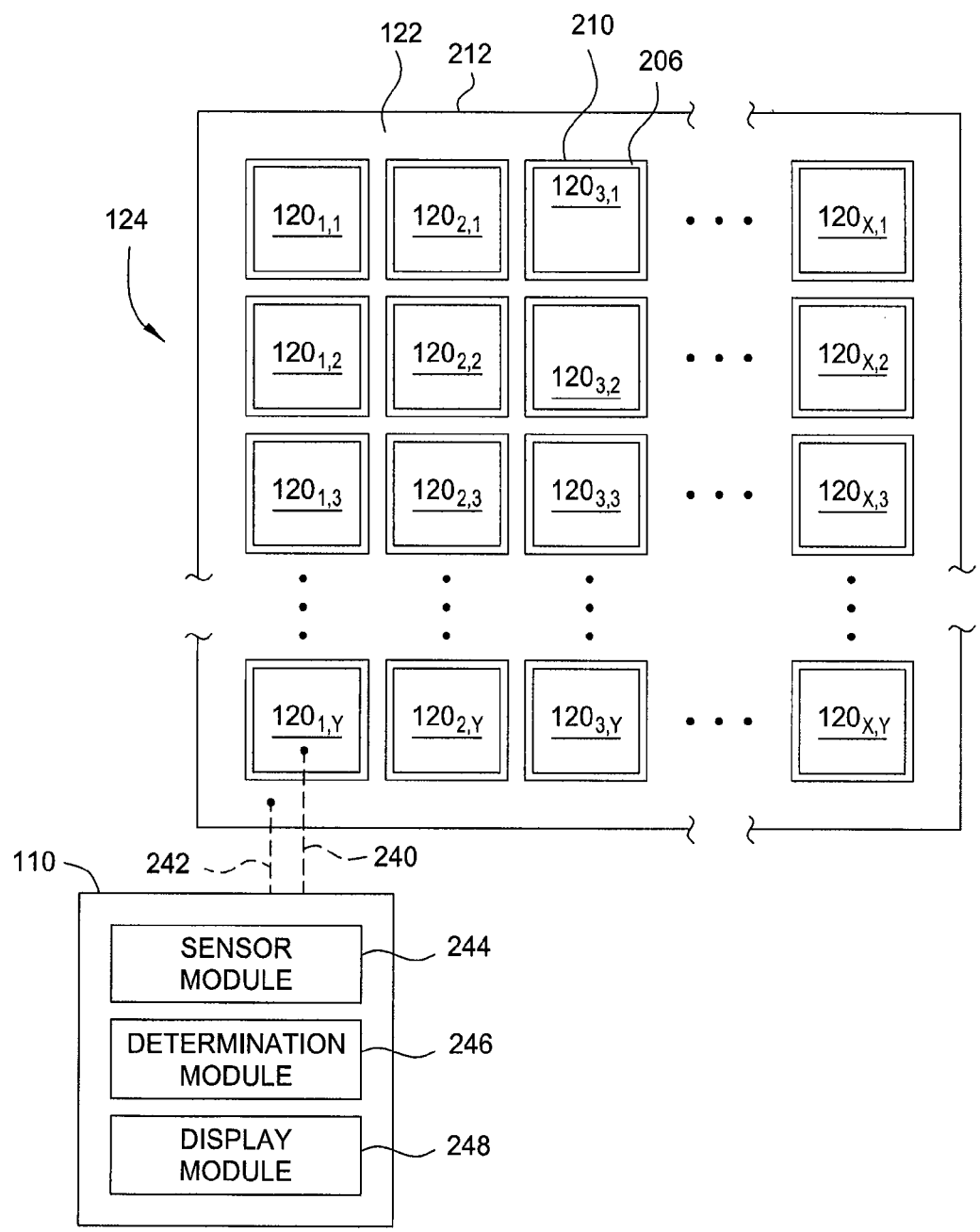
FIG. 2 illustrates a simplified exemplary array of sensor elements that may be used in the input device of FIG. 1.

FIG. 2 shows a portion of an exemplary pattern of sensing elements 124 configured to sense in the sensing region 170 associated with the pattern, according to some embodiments. For clarity of illustration and description, FIG. 2 shows the sensor electrodes 120 of the sensing elements 124 in a pattern of simple rectangles with the grid electrode 222 disposed therebetween, and does not show various other components. The exemplary pattern of sensing elements 124 comprises an array of sensor electrodes $120_{X,Y}$ (referred collectively as sensor electrodes 120) arranged in X columns and Y rows, wherein X and Y are positive integers, although one of X and Y may be zero. It is contemplated that the pattern of sensing elements 124 may comprises a plurality of sensor electrodes 120 having other configurations, such as polar arrays, repeating patters, non-repeating patterns, a single row or column, or other suitable arrangement. Further, in various embodiments the number of sensor electrodes may vary from row to row and/or column to column. In one embodiment, at least one row and/or column of sensor electrodes 120 is offset from the others, such it extends further in at least one direction than the others. The sensor electrodes 120 and grid electrodes 122 are coupled to the processing system 110 and utilized to determine the presence (or lack thereof) of an input object 140 in the sensing region 170.

In a first mode of operation, the arrangement of sensor electrodes 120 (120-1, 120-2, 120-3, . . . 120-n) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

The sensor electrodes 120 are typically ohmically isolated from each other, and also ohmically isolated from the grid electrode 122. That is, one or more insulators separate the sensor electrodes 120 (and grid electrode 122) and prevent them from electrically shorting to each other. In some embodiments, the sensor electrodes 120 and grid electrode 122 are separated by insulative gap 206. The insulative gap 206 separating the sensor electrodes 120 and grid electrode 122 may be filled with an electrically insulating material, or may be an air gap. In some embodiments, the sensor electrodes 120 and the grid electrode 122 are vertically separated by one or more layers of insulative material. In some other embodiments, the sensor electrodes 120 and the grid electrode 122 are separated by one or more substrates; for example, they may be disposed on opposite sides of the same substrate, or on different substrates. In yet other embodiments, the grid electrode 122 may be composed of multiple layers on the same substrate, or on different substrates. In one embodiment, a first grid electrode may be formed on a first substrate or first side of a substrate and a second grid electrode may be formed on a second substrate or a second side of a substrate. For example, a first grid comprises one or more common electrodes disposed on a thin film transistor (TFT) layer of the display device 160 and a second grid electrode is disposed on the color filter glass of the display device 160. In one embodiment, the dimensions of the first grid electrode are equal to the dimensions of the second grid electrode. In one embodiment, at least one dimension of the first grid electrode differs from a dimension of the second grid electrode. For example, the first grid electrode may be configured such that is disposed between a first and second sensor electrode 120 and the second grid electrode may be configured such that it overlaps at least one of the first and second sensor electrodes 120 and the first grid electrode. Further, the first grid electrode may be configured such that it is disposed between a first and second sensor electrode 120 and the second grid electrode may be configured such that it only overlaps the first grid electrode and is smaller than the first grid electrode.

In a second mode of operation, the sensor electrodes 120 (120-1, 120-2, 120-3, ... 120-n) may be utilized to detect the presence of an input object via transcapacitive sensing techniques when a transmitter signal is driven onto the grid electrode 122. That is, processing system 110 is configured drive the grid electrode 122 with a transmitter signal and receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operate switch between any two or more of the modes described above.

The areas of localized capacitive sensing of capacitive couplings may be termed "capacitive pixels." Capacitive pixels may be formed between an individual sensor electrode 120 and reference voltage in the first mode of operation, between the sensor electrodes 120 and grid electrode 122 in the second mode of operation, and between groups of sensor electrodes 120 used as transmitter and receiver electrodes. The capacitive coupling changes with the proximity and motion of input objects 140 in the sensing region 170 associated with the sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit a transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes are received with using a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode with a transmitter or other signal and/or voltage potential. In one embodiment, the switching element may be configured to couple more than one receiver electrode to a common receiver at the same time.

In other embodiments, "scanning" sensor electrodes 120 to determine these capacitive coupling comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment each of the sensor electrodes 120 are simultaneously driven and received with, obtaining an absolute capacitive measurement simultaneously from each of the sensor electrodes 120. In various embodiments, processing system 110 may configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a course capacitive image that may not be usable to discern precise positional information. However, a course capacitive image may be used to sense presence of an input object. In one embodiment, the course capacitive image may be used to move processing system 110 or the input device 100 out of a doze or low power mode. In one embodiment, the course capacitive image may be used to move a capacitive sensor integrated circuit out of a doze mode or low power mode. In another embodiment, the course capacitive image may be used to move a host integrated circuit out of a doze mode or low power mode. The course capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground or from stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode 122 comprise one or more common electrodes, various other display electrodes as describe above may also be used in conjunction with the common electrode or as an alternative to the common electrodes. In various embodiments, the sensor electrodes 120 and grid electrode 122 comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 2, the processing system 110 coupled to the sensor electrodes 120 includes a sensor module 244 and optionally, a display module 248. The sensor module 244 includes circuitry configured to drive at least one of the sensor electrodes 120 for capacitive sensing during periods in which input sensing is desired. In one embodiment, the sensor module is configured to drive a modulated signal onto the at least one sensor electrode to detect changes in absolute capacitance between the at least one sensor electrode and an input object. In another embodiment, the sensor module is configured to drive a transmitter signal onto the at least one sensor electrode to detect changes in a transcapacitance between the at least one sensor electrode and another sensor electrode. The modulated and transmitter signals are generally varying voltage signals comprising a plurality of voltage transitions over a period of time allocated for input sensing. In various embodiments, the sensor electrodes 120 and/or grid electrode 122 may be driven differently in different modes of operation. In one embodiment, the sensor electrodes 120 and/or grid electrode 122 may be driven with signals (modulated signals, transmitter signals and/or shield signals) that may differ in any one of phase, amplitude and/or shape. In various embodiments, three modulated signal and transmitter signal are similar in at least one shape, frequency, amplitude and/or phase. In other embodiments, the modulated signal and the transmitter signals are different in frequency, shape, phase, amplitude and phase. The sensor module 244 may be selectively coupled one or more of the sensor electrodes 120 and/or the grid electrode 122. For example, the sensor module 244 may be coupled selected portions of the sensor electrodes 120 and operate in either an absolute or transcapacitive sensing mode. In another example, the sensor module 244 may be a different portion of the sensor electrodes 120 and operate in either an absolute or transcapacitive sensing mode. In yet another example, the sensor module 244 may be coupled to all the sensor electrodes 120 and operate in either an absolute or transcapacitive sensing mode. The sensor module 244 is also configured to operate the grid electrode 122 as a shield electrode. Processing system 110 is configured to operate the grid electrode 122 as a shield electrode that may shield the sensor electrodes 120 from the electrical effects of nearby conductors. In one embodiment, processing system is configured to operate the grid electrode 122 as a shield electrode that may shield sensor electrodes 120 from the electrical effects of nearby conductors and guard the sensor electrodes 120 from grid electrode 122, at least partially reducing the parasitic capacitance between the grid electrode 122 and the sensor electrodes 120. In one embodiment, a shielding signal is driven onto the grid electrode 122. The shielding signal may be a ground signal, such as the system ground or other ground, or any other constant voltage (i.e., non-modulated) signal. In another embodiment, operating the grid electrode 122 as a shield electrode may comprise electrically floating the grid electrode. In embodiment, gird electrode 122 is able to operate as an effective shield electrode while being electrode floated due to its large coupling to the other sensor electrodes. In other embodiment, the shielding signal may be referred to as a guard signal where the guard signal is a varying voltage signal. In some implementations, the guard signal has at least one of a similar phase, frequency and amplitude as the modulated signal driven on to the sensor electrodes. In one or more embodiment, routing (e.g., traces 240 and/or 242) may be shielded from responding to an input object due to routing beneath the grid electrode 122 and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 244 and display module 248 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g. near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 244 includes circuitry configured to receive resulting signals with the sensing elements 124 comprising effects corresponding to the modulated signals or the transmitter signals during periods in which input sensing is desired. The sensor module 244 may determine a position of the input object 140 in the sensing region 170 or may provide a signal including information indicative of the resulting signal to another module or processor, for example, determination module or a processor of the electronic system 150 (i.e., a host processor), for determining the position of the input object 140 in the sensing region 170.

The display module 248 may be included in or separate from the processing system 110. The display module 248 includes circuitry confirmed to provide display image update information to the display of the display device 160 during non-sensing (e.g., display updating) periods. In one embodiment, the sensor module 244, and display module 248 may be comprised within a common integrated circuit (first controller). In another embodiment, two of the sensor module 244, sensor module 244 and display module 248 are be comprised in a first integrated circuit and the other one of the three modules is comprised in a second integrated circuit. In those embodiments comprising multiple integrated circuits, a synchronization mechanism may be coupled between them, configured to synchronize display updating periods, sensing periods, transmitter signals, display update signals and the like.

As discussed above, the sensor electrodes 120 of the sensing elements 124 may be formed as discrete geometric forms, polygons, bars, pads, lines or other shape, which are ohmically isolated from one another. In various embodiments, ohmically isolated comprises passively isolated, where active switches may be configured to couple different sensor electrodes to the same signal during a period of time. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials, or the combination of the two. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, molybdenum and conductive carbon materials, among others and various sensor electrodes may be formed of a deposited stack of different conductive materials. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed a from mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, in various embodiments, the sensor electrodes 120 may comprise a center to center pitch in the range of about 4 to about 5 mm; however, in other embodiments, the pitch may be less than about 4 mm or greater than about 5 mm.

The grid electrode 122 may be fabricated similar to the sensor electrodes 120. The sensor electrodes 120 and the grid electrode 122 may be coupled to the processing system 110 utilizing conductive routing traces 240, 242 (shown in phantom). The conductive routing traces 240, 242 may be formed in the same plane at least one of the sensor electrodes 120 and the grid electrode 122, or may be formed on one or more separate substrates and connected to the respective electrodes 120, 122 by vias (not shown). Conductive routing traces 240 and 242 may be formed on a metal layer disposed such that the sensor electrodes 120 are between the metal layer and the input object. In one embodiment the metal layer comprises source driver lines and/or gate lines for a display device. The conductive routing traces 240, 242, and vias between them may be obscured from a user by a black mask layer disposed between them and the user of the display device. At least one of the conductive routing traces 240 and 242 may comprise one or more routing traces (conductors) in the source driver metal layer. In one or more embodiments such a layer may be referred to as metal interconnect layer two. Further, conductive routing traces 240 and/or 242 may be disposed on a metal layer between source driver lines. Alternately, at least one of the conductive routing traces 240 and 242 may comprise one or more conductors in the gate driver metal layer or gate driver lines not configured for display updating. Further, conductive routing traces 240 and/or 242 may be disposed on a metal layer between gate driver lines. In another embodiment, at least one of the conductive routing traces 240 and 242 may comprise one or more conductors in the Vcom jumper metal layer or Vcom lines not otherwise configured for display updating. Further, conductive routing traces 240 and/or 242 may be disposed on a metal layer between gate electrodes. In other embodiments the metal layer is included in addition to a layer comprising the source driver lines and/or gate lines. A portion of the conductive traces 140, 142 may also be formed laterally outward of the areal bounds of the sensing elements 124. In various embodiments, the conductive routing traces 240 and/or 242 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device may comprise a "dual gate" or "half source driver" configuration, allowing conductive routing traces 240 and/or 242 to be disposed between source drivers on the source driver layer. In one or more embodiments, orthogonal directions of connections between the conductive routing traces 240 and 242 they may be place on separate layers with vias between them The grid electrode 122 is disposed between at least two of the sensor electrodes 120. The grid electrode 122 may at least partially circumscribe the plurality of sensor electrodes 120 as a group, and may also, or in the alternative, completely or partially circumscribe one or more of the sensor electrodes 120. In one embodiment, the grid electrode 122 is a planar body 212 having a plurality of apertures 210, each aperture 210 circumscribing a respective one of the sensor electrodes 120. Accordingly, the grid electrode 122 separates and circumscribes at least 3 or more of sensor electrodes 120, and in this example, separates and circumscribes all of sensor electrodes 120. The gap 206 spaces the body 212 from the sensor electrode 120 disposed in the aperture 210. In one or more embodiments, the grid electrode 122 is configured to substantially fill the space defined by the gap 206. In one embodiment a second grid electrode may be disposed on a substrate between grid electrode 122 and a touch input layer. The second grid electrode may be the same size as grid electrode 122, or larger than grid electrode 122 such that is overlaps one more sensor electrodes 120 and grid electrode or smaller than grid electrode 122 such that it overlaps a portion of the grid electrode 122. In various embodiments, the grid electrode 122 is disposed between at least two of sensor electrodes 120 such that the grid electrode 122 is on different layer (i.e., different substrate or side of the same substrate) and overlaps a portion of at least two sensor electrodes and the gap between the sensor electrodes. In the embodiments where the sensor electrodes 120 comprise one or more common electrodes, the sensor electrodes may comprise the entirety of the common electrode layer.

The grid electrode 122 may also be segmented. The segmentation of the grid electrode 122 may allow segments of the grid electrode 122 be less visible. The segments may be interconnect using traces or vias, so that the all the segments of the grid electrode 122 may be driven simultaneously with a common signal. Alternatively, one or more of the segments of the grid electrode 122 may be driven independently to facilitate scanning of the sensor electrodes 120 when configured as receiver electrodes in certain modes of operation as discussed further below.

An alternative grid electrode 122 that may be used in the input device 100 of FIG. 1 may comprise substantially more surface area than the sensor electrodes 120. For example, the grid electrode 122 may at least partially circumscribe one or more sensor electrodes 120. Additionally, or in the alternative, the grid electrode 122 may completely circumscribe at least one sensor electrode 120 and only partially circumscribes other sensor electrodes 120. In other embodiments, the grid electrode 122 may completely circumscribe all of the sensor electrodes 120. It is also contemplated that the grid electrode 122 may be segmented.

In another example, each sensor electrode 120 may be coupled to a different conductive routing trace 240 and to a common pin of processing system 110. For example, a multiplexer (or similar circuit element) may be coupled to the conductive routing trace or traces 240 so that the sensor electrodes 120 may be individually coupled to the processing system 110 when sharing a conductive routing trace 240. In one other example, each sensor electrode 120 may be coupled to a different conductive routing trace 240, where each conductive routing trace 240 is coupled to a different pin of processing system 110. Processing system 110 may be configured to simultaneously receive with multiple sensor electrodes 120 or receive with each sensor electrode 120 independently. In one embodiment, processing system 110 may be configured to receive with a plurality of sensor electrodes 120 using a scanning time multiplexed scheme when more than one grid electrode is driven with a transmitter signal. The grid electrodes may be adjacent to each other or non-adjacent to each other. In one embodiment, two sensor electrodes may be simultaneously received with while grid electrode that corresponds to one of the sensor electrodes is driven with a transmitter signal.

Processing system 110 may be configured to simultaneously drive transmitter signals onto each grid electrode 122 and receive resulting signals with the sensor electrodes 120. In such an embodiment, each grid electrode 122 may be driven with a transmitter signal that is based on a different one of a plurality of digital codes. The digital codes may be any code such that they provide mathematical independent results. In one embodiment, the digital codes for the set of transmitters are substantially orthogonal—i.e., exhibit very low cross-correlation, as is known in the art. Note that two codes may be considered substantially orthogonal even when those codes do not exhibit strict, zero cross-correlation. In a particular embodiment, for example, the digital codes are pseudo-random sequence codes. In other embodiments, Walsh codes, Gold codes, or another appropriate quasi-orthogonal or orthogonal codes are used. In another embodiment, processing system 110 is configured to simultaneously drive the grid electrodes 122 with the same transmitter signal while independently receiving with the sensor electrodes 120. Some substantially orthogonal codes may be selected that have near zero sums which reduce the effect of the codes coupling to display elements, one set of such codes are circulant codes where each code vector is a rotation of the other vectors.

Processing system 110 may be configured to scan through the grid electrodes 122, driving transmitter signals on to the grid electrodes 122 one at a time, while receiving with the sensor electrodes 120. In one embodiment, only those sensor electrodes 120 that are circumscribed by the grid electrode 122 which is being driven are received with. In other embodiments, all of or some portion of the sensor electrodes 120 may be received with a grid electrode 122 that is being driven.

Processing system 110 may be configured to selectively configure the grid electrode 122 or sensor electrodes 120 based on the positional information of an input object 140. For example, in one embodiment, processing system 110 may drive transmitter signals onto the grid electrodes 122 such that the grid electrode is driven as one large grid electrode 122. Processing system 110 may selectively drive only a portion of the grid electrodes 122 that are proximate the detected input object or objects 140. In another embodiment, For example, in one embodiment, processing system 110 may drive shielding signals onto the grid electrodes 122 such that the grid electrode is driven as one large grid electrode 122. Further, processing system 110 may selectively drive only a portion of the grid electrodes 122 with a shielding signal that are proximate the detected input object or objects 140. In one embodiment the driving scheme (as discussed above) used to drive the grid electrode 122 may vary based on the positional information of the input object or objects 140.

Figure 3:
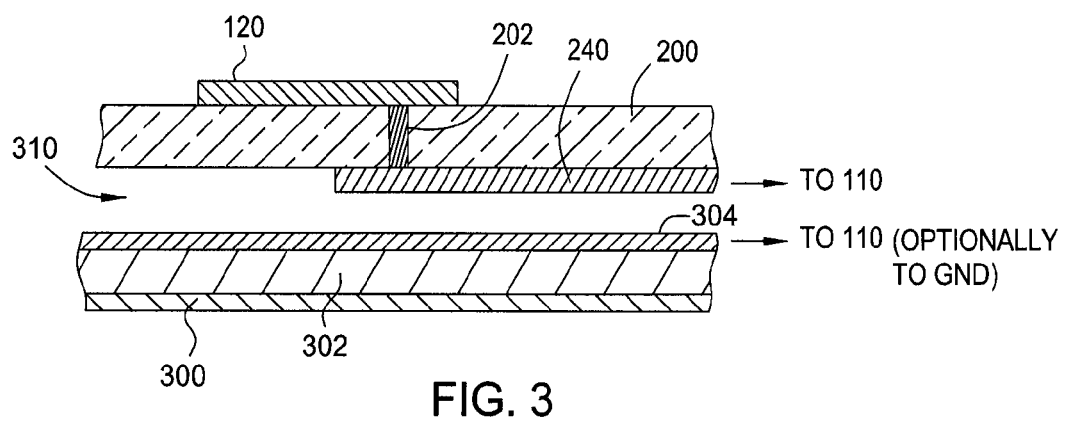
FIG. 3 is a simplified sectional view of a sensor electrode of the sensor elements of FIG. 1 illustrating a conductive routing trace coupled to the sensor electrode by a via, and a shield electrode disposed between the conductive routing trace and a housing of the input device.

FIG. 3 is a simplified sectional view of a sensor electrode 120 of the sensing elements 124 of FIG. 1 illustrating a portion of a film stack of the input device 100 having a conductive routing trace 240 disposed in a layer parallel to a layer in which a shield electrode 304 is formed. The orientation of the conductive routing trace 240 and the shield electrode 304 within the film stack is exemplary in FIG. 3, as it is contemplated that the conductive routing trace 240 and the shield electrode 304 may be disposed on any of the layers within the film stack, for example as formed on an existing layer of a display film stack or on a new layer added to a display film stack, as further described below.

The sensor electrode 120 is disposed on a substrate 200. The substrate 200 may be any suitable substrate that is part of the input device 100 or display device 160. The substrate 200 is generally fabricated from, covered or coated with a dielectric material to prevent cross-talk between the sensor electrodes 120. In the embodiment depicted in FIG. 3, at least one via 202 is utilized to couple the sensor electrode 120 to a conductive routing trace 240 through the substrate 200.

Figure 4:
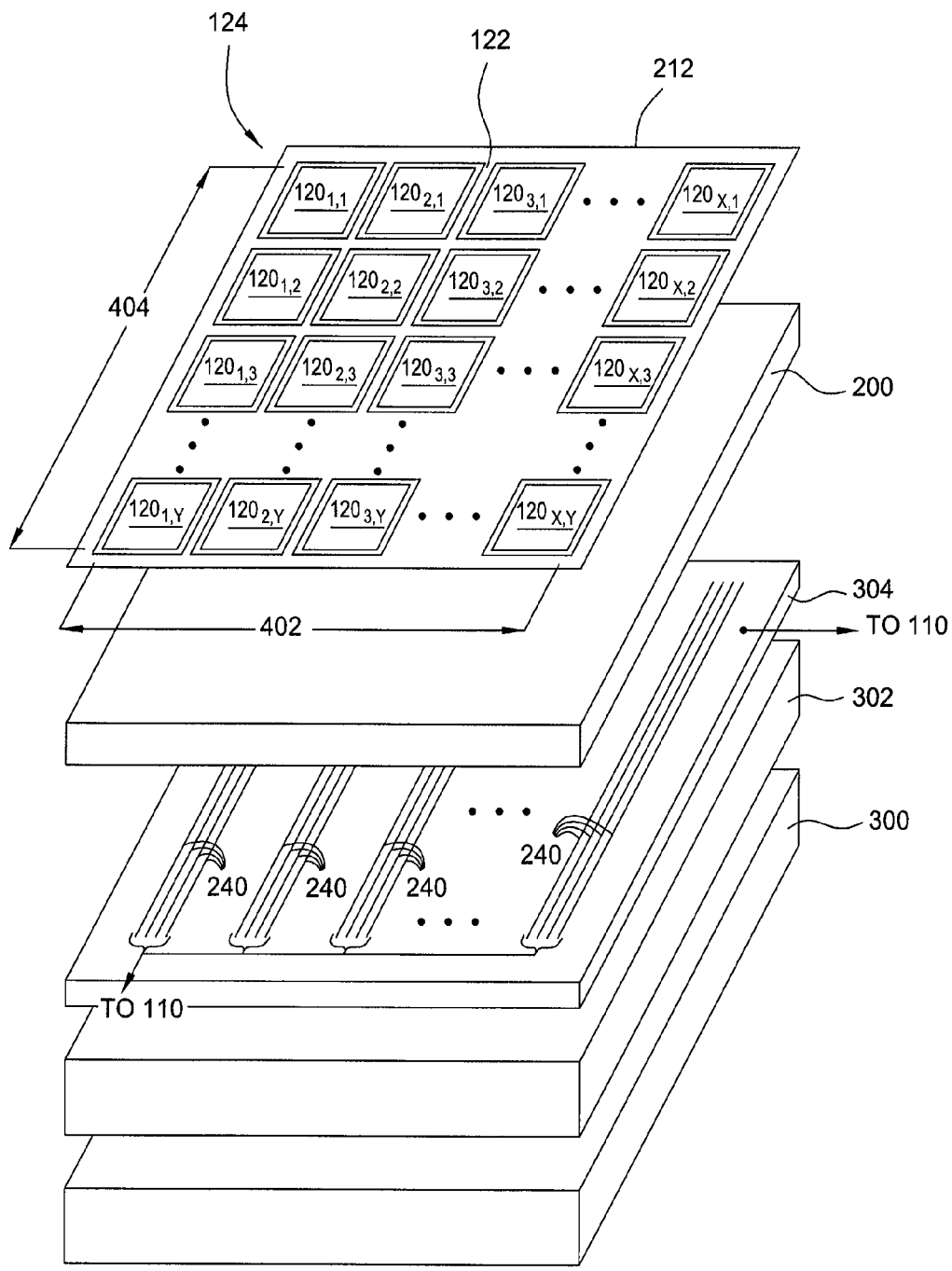
FIG. 4 a simplified exploded isometric view schematically illustrating, without depicting the vias, the arrangement between the various layers shown in FIG. 3.

FIG. 4 is a simplified exploded isometric view schematically illustrating, without depicting the vias 202 shown in FIG. 3, one example of an arrangement between the conductive routing traces 240, the sensor electrodes 120 and the shield electrode 304. The sensor electrodes 120 and the conductive routing traces 240 are shown stacked in parallel layers. As the conductive routing traces 240 are disposed on a layer different than that of the sensor electrodes 120, the conductive routing traces 240 coupled to sensor electrodes 120 farthest from the processing system 110 are routed below other sensor electrodes 120, thus forming a layer of conductors spanning the width of the array of sensor electrodes 120, wherein the layer of conductors comprising the conductive routing traces 240 having about the same areal extend as that of the layer comprising the sensor electrodes 120.

The conductive routing traces 240 are also disposed on a layer different than that of the shield electrode 304. The layer of the conductive routing traces 240 generally parallel to the layer comprising the shield electrode 304.

The shield electrode 304 generally may have an areal extent that is at least as large as the areal extent of the array of sensing elements 120. The areal extent of the array of sensing elements 120 may be defined as the product of a width 402 and depth 404 of the array.

Returning back to FIG. 3, the sensor electrode 120 and the conductive routing trace 240 are shown on disposed on opposite sides of the substrate 200. However, in other embodiments, the sensor electrode 120 and the conductive routing trace 240 may be disposed on the same side of the substrate 200. In yet other embodiments, the sensor electrode 120 and the conductive routing trace 240 may be separated by one or more additional substrates (or layers) that are stacked with the substrate 200.

The conductive routing traces 240 are generally disposed on the same side of the sensor electrodes 120 as the shield electrode 304. A space 310 disposed between the conductive routing traces 240 and the shield electrode 304 may be filled by one or more other layers of the input device 100, as further described below with reference to FIG. 5. The distance across the space 310 generally remains constant, even as the input device 100 is deflected or bent in response to a force being applied to the input device 100 in a direction defined normally from the substrate 200 towards the shield electrode 304.

The shield electrode 304 is generally disposed between the conductive routing traces 240 and the housing 300. The shield electrode 304 is generally disposed in a spaced apart relation with the housing 300. The shield electrode 304 is arranged to maintain a substantially uniform distance (in a direction normal to the plane of the shield electrode 304) from the conductive routing traces 240 even as the shield electrode 304 is deflected, for example, bent, towards the bottom of the housing 300.

The shield electrode 304 is fabricated from a conductive material, such as a transparent conductive oxide (TCO), a metal layer or metal alloy layer. In one embodiment, the shield electrode 304 is fabricated from an indium tin oxide (ITO) layer. The shield electrode 304 may be fabricated as a solid layer or foil, or as a conductive metal mesh. As discussed above, the shield electrode 304 may have an areal extent that is substantially equal to that of the sensing elements 124 (comprised of the sensor electrodes 120) as shown in FIG. 4.

The shield electrode 304 is coupled to the processing system 110, however, in some embodiments, the shield electrode 304 may be grounded. For example in some embodiments, particularly where the housing 300 is fabricated from a conductive material, the shield electrode 304 may be grounded to provide effective shielding of the conductive routing traces 240 and the sensor electrode 120, among other layers of the input device 100.

When coupled to the shield electrode 304, the processing system 110 may drive a shield signal onto the shield electrode 304 which functions to reduce changes in background capacitance between at least the conductive routing traces 240 and the housing 300. In some embodiments, the shield signal driven onto the shield electrode 304 provides effective shielding of the conductive routing traces 240 and the sensor electrode 120, among other layers of the input device 100. In one embodiment, the shield signal may be a ground signal, such as the system ground or other ground signal. In another embodiment, the processing system 110 may drive a shield signal having constant (i.e., non-modulated) voltage signal onto the shield electrode 304. In other embodiments, the processing system 110 may drive a guard signal having a modulated voltage signal onto the shield electrode 304. In such embodiments, the shield signal may be referred to as a guard signal. In some embodiments, the modulated voltage signal driven onto the shield electrode 304 may be a varying voltage signal having at least one of a similar phase, frequency and amplitude as the modulated signal driven on to the sensor electrodes for capacitive sensing. Alternatively, the shield electrode 304 may be electrically floating.

A compressible layer 302 is disposed between the shield electrode 304 and the housing 300. The compressible layer 302 comprises a dielectric material. In one embodiment, the compressible layer 302 is an air gap. The compressible layer 302 generally allows the input device 100 to displace or flex relative to the housing 300 in response to a force applied by an input object 140 so that the components of the input device 100 are not damaged during normal use.

Figure 5:
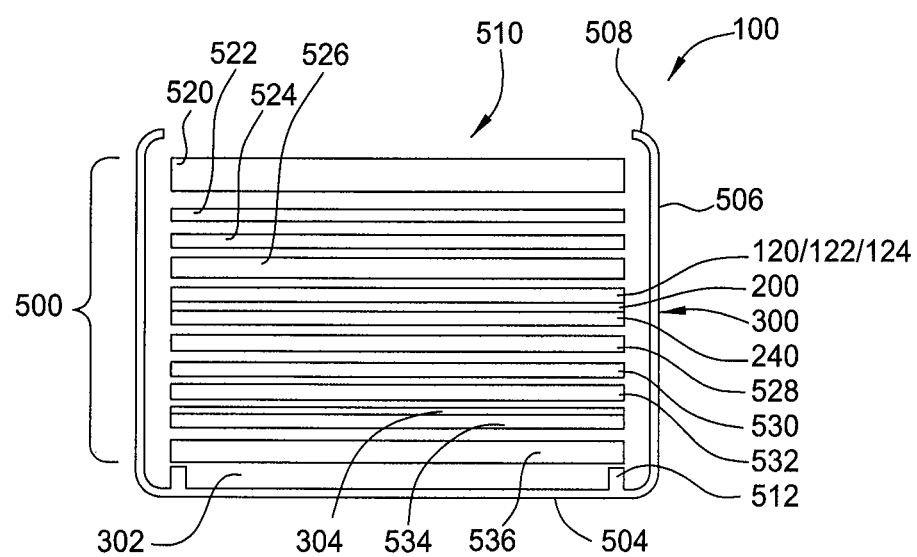
FIG. 5 is a simplified sectional view of a film stack that includes layers on which the conductive routing traces, the sensor electrodes and a shield electrode are disposed that may be utilized in the input device of FIG. 1.

FIG. 5 is a simplified sectional view of one embodiment of a film stack 500 that includes layers on which the conductive routing traces 240, the sensor electrodes 120 and the shield electrode 304 are disposed. The film stack 500 is slightly exploded to allow the individual layers to be more clearly depicted. The relative thicknesses of the layers of the film stack 500 are not to scale in FIG. 5. Although the film stack 500 described below is configured as a liquid crystal display (LCD), other types displays may be utilized, such as but not limited to light emitting diode (LED), organic LED (OLED), cathode ray tube (CRT), plasma, electroluminescence (EL), or other display technology.

The film stack 500 is disposed in the housing 300. The housing 300 includes a top 508, sides 506 and bottom 504. An optionally support member 512 may extend from the bottom 504 to support the film stack 500 spaced above the bottom 504. The top 508 includes an opening 510 through which the film stack 500 may be visible and accessed by an input object 140, such as shown in FIG. 1, for touch sensing.

The film stack 500 generally includes a cover lens 520 that is exposed through the opening 510 of the housing 300. Thus, the cover lens 520 is on the viewing side of the film stack 500. The cover lens 520 generally defines or is proximate to the top of the film stack 500. The film stack 500 includes a polarizing film 524 disposed below the cover lens 520. The polarizing film 524 may be secured to the cover lens 520 by an optically clear adhesive 522.

The film stack 500 also includes a color filter glass 526 disposed below the polarizing film 524. The color filter glass 526 may be disposed between the polarizing film 524 and a layer comprising sensing elements 124. The layer comprising the sensing elements 124 may include the sensor electrodes 120 and the grid electrode 122. As discussed above, the substrate 200 may be disposed between the sensing elements 124 and a layer containing the conductive routing traces 240. A color filter layer 528 may disposed between the layer containing the conductive routing traces 240 and a liquid crystal material (LCD) layer 530. A thin film transistor (TFT) layer 532 may be disposed between the LCD layer 530 may disposed between a layer containing the shield electrode 304. The TFT layer 532 is also known as the TFT-substrate. A polarizing film layer 534 may be disposed between the layer containing the shield electrode 304 and a backlighting module 536. The backlighting module 536 may include one or more layers. The compressible layer 302 is disposed between the backlighting module 536 and the bottom 504 of the housing 300. Thus, the backlighting module 536 is on the non-viewing side of the film stack 500.

Although the sensor electrodes 120, conductive routing traces 240, shield electrode 304 and compressible layer 302 are illustrated in FIG. 5 at certain locations within the film stack 500, one or more of the sensor electrodes 120, conductive routing traces 240, shield electrode 304 and compressible layer 302 may be disposed between other layers as long as the shield electrode 304 is disposed between the compressible layer 302 and the conductive routing traces 240. For example, the shield electrode 304 may be formed on or as the polarizing film layer 534, below the TFT layer 532, or as a conductive reflective layer in or on the backlighting module 536, among other locations.

Figure 6:
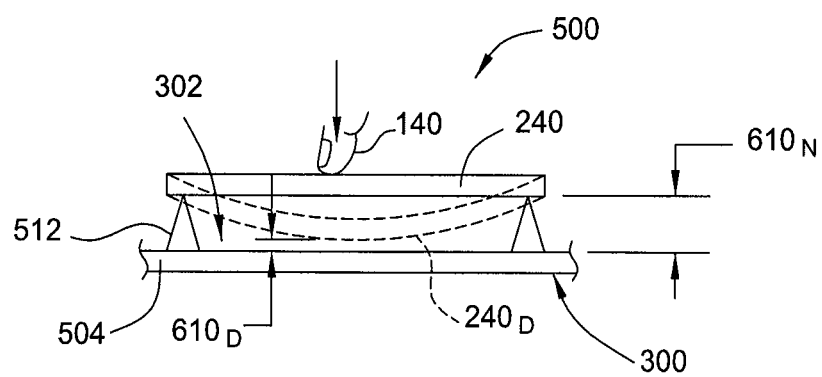
FIG. 6 is a simplified side view schematically illustrating the displacement of the conductive routing traces, with the shield electrode removed, relative to the housing in response to an input force applied to the display film stack.

FIG. 6 is a simplified side view schematically illustrating displacement of the conductive routing traces 240 relative to the housing 300 in response to an input force applied to the film stack 500 (represented in FIG. 6 by the conductive routing traces 240). The shield electrode 304 is not illustrated in FIG. 6. The input force is generally applied by the input object 140, such as a finger, stylus, pen and the like.

In FIG. 6, the layer comprising the conductive routing traces 240 is generally flat when no force is applied, as depicted by the solid lines. When a force is applied, such as a force normal to the surface (i.e., plane of the conductive routing traces 240), the conductive routing traces 240 deflect or bend into the space occupied by the compressible layer 302, as shown by the dashed lines identified by reference numeral 240$_D$. In the non-deflected position, the conductive routing traces 240 are spaced from the bottom 504 of the housing 300 by a distance 610$_N$. In the deflected position in response to the applied force, the conductive routing traces 240$_D$ are spaced from the bottom 504 of the housing 300 by a distance 610$_D$, which is less than the distance 610$_N$. In conventional devices which do not have a shield electrode, the difference between the distances 610$_D$ and 610$_N$ would cause a change in the background capacitance, which may result in a distortion of the image of a response measured by the input device 100. Correspondingly, touch performance, i.e., sensing accuracy, is degraded.

The shield electrode 304 mitigates such changes in background capacitance due to bending of the film stack 500 and thus, enhances device performance. As the shield electrode 304 is part of the film stack 500, the shield electrode 304 bends and displaces uniformly with the other components of the film stack 500, including the conductive routing traces 240 and sensor electrodes 120. Since the distance between the shield electrode 304 and the conductive routing traces 240 and sensor electrodes 120 remains substantially equal as the film stack 500 flexes between flat and curved orientations, the background capacitance between to the conductive routing traces 240, sensor electrodes 120 and other components of the film stack, such as gate and source lines (not shown) remains substantially constant, which in turn reduces the probability of distortion and improves device performance.

Figure 7:
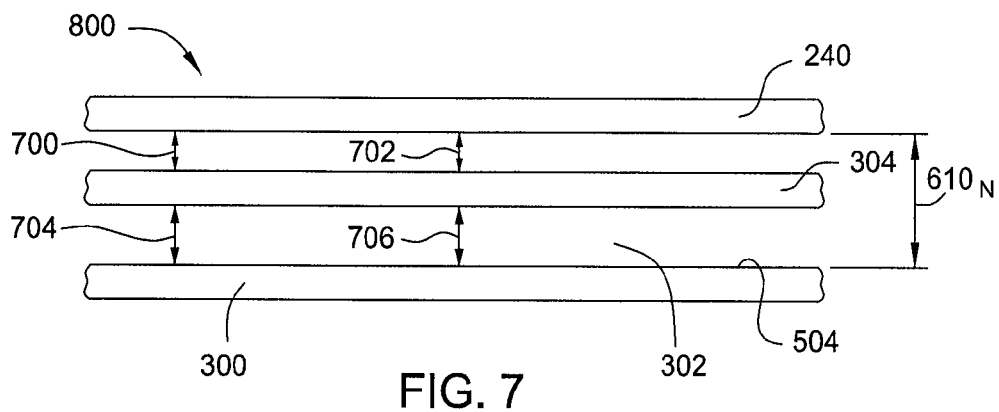
FIGS. 7 and 8 are simplified side views schematically illustrating the displacement of the conductive routing traces relative to the shield electrode and the housing in response to an input force applied to the display film stack.
Figure 8:
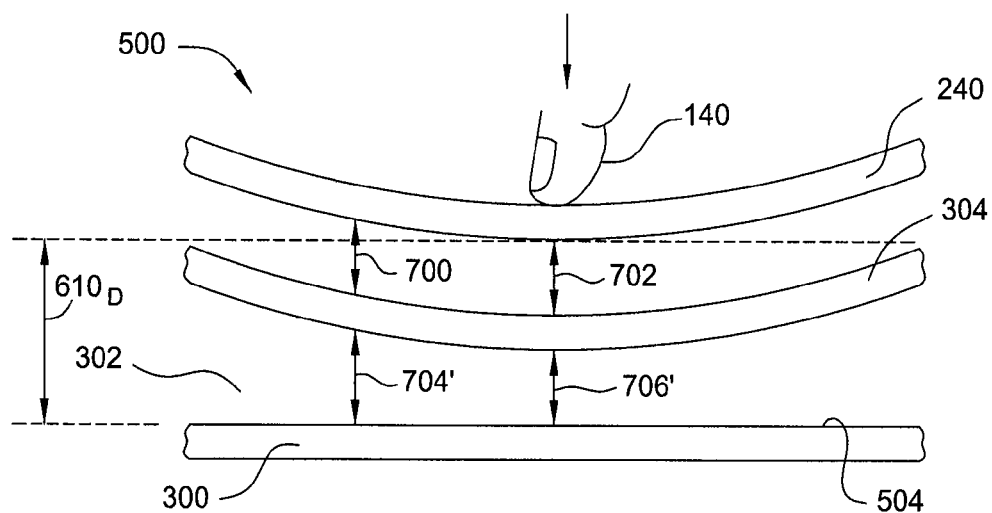

FIGS. 7 and 8 are simplified side views schematically illustrating the displacement of the conductive routing traces 240 relative to the shield electrode 304 and the housing 300 in response to an input force applied by in input object 140 to the film stack 500. FIG. 7 depicts the film stack 500 in a substantially flat state without the application of a force normal to the film stack 500 from an input object 140, while FIG. 8 depicts the film stack 500 in a curved state due to the application of a force normal to the film stack 500 from the input object 140.

Referring first to FIG. 7, the conductive routing traces 240, the shield electrode 304 and the housing 300 are shown in a parallel, spaced apart relation while the film stack 500 has no external force applied thereto. The distance $610_N$ between the conductive routing traces 240 and the housing 300 is shown for reference. A distance 700 is defined between the conductive routing traces 240 and the shield electrode 304, for example, at a location proximate the edge of the array of sensing elements 124. A distance 702 is defined between the conductive routing traces 240 and the shield electrode 304, for example, at a location proximate the center of the array of sensing elements 124. When the film stack 500 has no external force applied thereto, the distance 700 is approximately equal to the distance 702.

Similarly, a distance 704 is defined between the housing 300 and the shield electrode 304, for example, at a location proximate the edge of the shield electrode 304. A distance 706 is defined between the housing 300 and the shield electrode 304, for example, at a location proximate the center of the shield electrode 304. Again, when the film stack 500 has no external force applied thereto, the distance 704 is approximately equal to the distance 706.

Referring now to FIG. 8, the conductive routing traces 240, the shield electrode 304 and the housing 300 are shown in a deflected state due to an external force being applied to the film stack 500 by in input object 140 in a direction normal to the shield electrode 304 (and other layers of the film stack 500) and towards the bottom 504 of the housing 300. The distance $610_D$ between the conductive routing traces 240 and the housing 300 is shown for reference. In the deflected state, the distances 700 and 702 defined between the conductive routing traces 240 and the shield electrode 304 remain approximately equal and substantially unchanged from the un-deflected state shown in FIG. 7.

However due to the deflection of the film stack 500 relative to the un-deflected housing 300, the distance 704 defined between the housing 300 and the shield electrode 304 decreases to a distance 704', while the distance 706 defined between the housing 300 and the shield electrode 304 decreases to 706'. Advantageously, the change in the distance between the housing 300 and the shield electrode 304 has little effect on background capacitance due to the presence of the shield electrode 304. But since the distances 700 and 702 defined between the conductive routing traces 240 and the shield electrode 304 remain approximately equal, the shield electrode 304 reduces or prevents changes in background capacitance to the conductive routing traces 240 and the sensor electrodes 120 due to the bending of the film stack, this enhancing device performance.

Advantageously, the use of the shield electrode 304 mitigates changes in background capacitance of the conductive routing traces 240 and sensor electrodes 120. The shield electrode 304 may be positioned in various locations within the film stack. In some embodiments, particularly where the housing 300 is fabricated from a conductive material, the shield electrode 304 may be grounded, while in other embodiments, the shield electrode 304 may be driven by the processing system 110 with a shield signal to provide effective shielding of the conductive routing traces 240 and the sensor electrode 120, among other layers of the film stack 500 comprising the input device 100.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. An input device comprising:
   a display film stack configured to display an image thought a top surface, the display film stack comprising:
      a plurality of sensor electrodes disposed in a matrix array; and
      a plurality of routing traces coupled to the sensor electrodes; and
   an electrically conductive shield having an areal extent approximately equal or greater than an active area of the plurality of sensor electrodes, the electrically conductive shield disposed below the matrix array and routing traces relative to the top surface;
   a compressible layer disposed below the display film stack, the compressible layer configured to allow the display film stack to deflect in response to a normal force applied to the top surface of display film stack; and
   a processing system coupled to the plurality of routing traces and to the electrically conductive shield, the processing system configured to operate the plurality of sensor electrodes for touch sensing and to operate the electrically conductive shield with a signal that mitigates changes in background capacitance across the plurality of sensor electrodes as the displace stack bends.

2. An input device comprising:
   a plurality of sensor electrodes disposed in a matrix array, the plurality of sensor electrodes configured to provide a metric indicative of presence of an input object in a sensing region proximate the matrix array when driven with a sensing signal;
   a compressible layer disposed below the film stack opposite the sensing region, the compressible layer configured to allow the display film stack to deflect in response to a normal force applied to the film stack in a direction of the electrically conductive shield;
   a plurality of routing traces coupled to the sensor electrodes; and an electrically conductive shield having an areal extent approximately equal or greater than an active area of the plurality of sensor electrodes, the matrix array, routing traces and electrically conductive shield part of a film stack, wherein the matrix array is closer to the sensing region than the electrically conductive shield, wherein the electrically conductive shield is configured to mitigate changes in background capacitance across the plurality of sensor electrodes as the film stack bends.

3. An input device comprising:
a display film stack configured to display an image, the display film stack having a viewing side and a non-viewing side, the display film stack comprising:
   a plurality of sensor electrodes;
   an electrically conductive shield disposed on the non-viewing side of all of the plurality of sensor electrodes; and
   a plurality of routing traces coupled to the sensor electrodes, the electrically conductive shield disposed between the routing traces and the non-viewing side of the display film stack; and
a compressible layer disposed between the non-viewing side of the display film stack and a grounded surface of the input device, the compressible layer configured to allow the display film stack to deflect towards the grounded surface of the input device in response to a force applied normally to the viewing side of the display film stack, and wherein the electrically conductive shield is configured to mitigate changes in background capacitance across the plurality of sensor electrodes as the film stack bends.

4. The input device of claim 3, wherein the electrically conductive shield is electrically floating.

5. The input device of claim 3, wherein the electrically conductive shield has an areal extent approximately equal or greater than an areal extent of plurality of sensor electrodes.

6. The input device of claim 3 further comprising:
a processing system coupled to the electrically conductive shield and configured to drive a modulated guard signal onto the electrically conductive shield.

7. The input device of claim 3 further comprising:
a processing system coupled to the electrically conductive shield and configured to drive a non-modulated shield signal onto the electrically conductive shield.

8. The input device of claim 3, wherein the display film stack further comprises:
a polarizing film layer having the electrically conductive shield disposed thereon.

9. The input device of claim 3, wherein the display film stack further comprises:
a backlighting module, wherein the electrically conductive shield is disposed on a layer of the backlighting module.

10. The input device of claim 3, wherein the display film stack further comprises:
a TFT-substrate having the electrically conductive shield disposed thereon.

11. The input device of claim 3, wherein the plurality of sensor electrodes are arranged in a matrix array.

12. An input device comprising:
a housing having a bottom;
a plurality of sensor electrodes disposed in a pattern on a substrate;
a plurality of routing traces coupled to the sensor electrodes;
an electrically conductive shield having an areal extent approximately equal or greater than an areal extent of the pattern of sensor electrodes, the electrically conductive shield and the substrate are part of a display film stack disposed in the housing, the conductive shield disposed between all of the plurality of sensor electrodes and the bottom of the housing; and
a compressible layer disposed between the display film stack and housing, the compressible layer configured to allow the display film stack to deflect towards the bottom of the housing.

13. The input device of claim 12, wherein the electrically conductive shield is electrically floating.

14. The input device of claim 12 further comprising:
a processing system coupled to the electrically conductive shield.

15. The input device of claim 14, wherein the processing system is configured to drive a shield signal onto the electrically conductive shield.

16. The input device of claim 14, wherein the processing system is further configured to:
drive a modulated shield signal onto the electrically conductive shield.

17. The input device of claim 14, wherein the processing system is further configured to:
drive a constant voltage onto the electrically conductive shield.

18. The input device of claim 12, wherein the display film stack further comprises:
a polarizing film layer having the electrically conductive shield disposed thereon.

19. The input device of claim 12, wherein the display film stack further comprises:
a backlighting module disposed between the plurality of routing traces and bottom of the housing, wherein the electrically conductive shield is disposed on a layer of the backlighting module.

20. The input device of claim 12, wherein the display film stack further comprises:
a TFT-substrate having the electrically conductive shield disposed thereon.

21. The input device of claim 12, wherein the pattern of sensor electrodes are arranged in a matrix array.

22. The input device of claim 12, wherein the compressible layer further comprises:
an air gap defined between the display film stack and the bottom of the housing.

23. A processing system comprising:
a touch control module having circuitry configured to:
operate a plurality of sensor electrodes for touch sensing; and
operate an electrically conductive shield disposed between all of the plurality of sensor electrodes and a grounded surface disposed on a non-viewing side of an input device with a shield signal that mitigates changes in background capacitance across the plurality of sensor electrodes as the plurality of sensor electrodes and conductive shield bend in response to an force applied to the sensor electrodes during a touch event.

24. The processing system of claim 23, wherein the circuitry of the touch control module, while operating the electrically conductive shield with a shield signal, is further configured to:
drive a shield signal that is modulated onto the electrically conductive shield.

25. The processing system of claim 23, wherein the circuitry of the touch control module, while operating the electrically conductive shield with a signal, is further configured to:
 drive a shield signal that is constant onto the electrically conductive shield.

* * * * *